United States Patent
Kayano et al.

(10) Patent No.: US 12,146,690 B2
(45) Date of Patent: Nov. 19, 2024

(54) FLUID TEMPERATURE ADJUSTMENT DEVICE

(71) Applicant: DAIKIN INDUSTRIES, LTD., Osaka (JP)

(72) Inventors: Akane Kayano, Osaka (JP); Yoshinari Asano, Osaka (JP); Hiroshi Hibino, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 707 days.

(21) Appl. No.: 17/195,260

(22) Filed: Mar. 8, 2021

(65) Prior Publication Data

US 2021/0190391 A1 Jun. 24, 2021

Related U.S. Application Data

(63) Continuation of application No. PCT/JP2019/035351, filed on Sep. 9, 2019.

(30) Foreign Application Priority Data

Sep. 14, 2018 (JP) ................................. 2018-172020

(51) Int. Cl.
F25B 21/00 (2006.01)
(52) U.S. Cl.
CPC ........ *F25B 21/00* (2013.01); *F25B 2321/002* (2013.01)
(58) Field of Classification Search
CPC ................ F25B 21/00; F25B 2321/002; F25B 2321/0021; F25B 2321/0212; F25B 21/04
See application file for complete search history.

(56) References Cited

U.S. PATENT DOCUMENTS

2010/0212327 A1 8/2010 Barve et al.

FOREIGN PATENT DOCUMENTS

| JP | 2004-333097 A | | 11/2004 |
|---|---|---|---|
| JP | 2004317040 A | * | 11/2004 |
| JP | 2012-177499 A | | 9/2012 |
| WO | 2009/043333 A2 | | 4/2009 |
| WO | 2017/162768 A1 | | 9/2017 |

OTHER PUBLICATIONS

JP-2004317040-A Translation.*
European Search Report of corresponding EP Application No. 19 86,0365.6 dated Feb. 8, 2022.
1 International Search Report of corresponding PCT Application No. PCT/JP2019/035351 dated Nov. 19, 2019.
International Preliminary Report of corresponding PCT Application No. PCT/JP2019/035351 dated Mar. 25, 2021.

* cited by examiner

*Primary Examiner* — Elizabeth J Martin
(74) *Attorney, Agent, or Firm* — GLOBAL IP COUNSELORS, LLP (57) ABSTRACT

A fluid temperature control device includes a magnetic circuit portion and a coil waterproof structure. The magnetic circuit portion includes a magnetic working substance container containing a magnetic working substance, and a coil that applies a magnetic field to the magnetic working substance container. The magnetic working substance container allows a fluid to flow through it to exchange heat with the magnetic working substance. The coil waterproof structure hinders water generated in the magnetic working substance container from flowing to the coil.

3 Claims, 7 Drawing Sheets

FLUID TEMPERATURE ADJUSTMENT DEVICE

CROSS-REFERENCE TO RELATED APPLICATIONS

This is a continuation of International Application No. PCT/JP2019/035351 filed on Sep. 9, 2019, which claims priority to Japanese Patent Application No. 2018-172020, filed on Sep. 14, 2018. The entire disclosures of these applications are incorporated by reference herein.

BACKGROUND

Field of Invention

The present disclosure relates to a fluid temperature control device.

Background Information

A device for controlling the fluid temperature using a magnetic working substance has been known. For example, Japanese Unexamined Patent Publication No. 2004-317040 discloses a temperature control device including a magnetic circuit that includes a magnetic working substance container and a coil. The magnetic working substance container contains a magnetic working substance. The coil applies a magnetic field to the magnetic working substance container. The temperature control device is configured to exchange heat between a fluid flowing through the magnetic working substance container and the magnetic working substance in the magnetic working substance container. For example, the magnetic working substance generates heat when a magnetic field is applied thereto, whereas the magnetic working substance absorbs heat when a magnetic field is removed (a magnetocaloric effect). The temperature control device uses this magnetocaloric effect to heat or cool the fluid.

SUMMARY

A first aspect of the present disclosure is directed to a fluid temperature control device. This fluid temperature control device includes a magnetic circuit portion and a coil waterproof structure. The magnetic circuit portion includes a magnetic working substance container containing a magnetic working substance, and a coil configured to apply a magnetic field to the magnetic working substance container. The magnetic working substance container allows a fluid to flow therethrough to exchange heat with the magnetic working substance. The coil waterproof structure is arranged and configured to hinder water generated in the magnetic working substance container from flowing to the coil.

DETAILED DESCRIPTION OF EMBODIMENT(S)

First Embodiment

A first embodiment will be described. A fluid temperature control device (20) of this embodiment controls the fluid temperature using a magnetocaloric effect, and is provided for an air-conditioning system (10) configured as, for example, a chiller for cooling only. Naturally, such a use of the fluid temperature control device (20) is merely an example. For example, the fluid temperature control device (20) may be provided for an air conditioner, a refrigerator, or any other apparatus.

Configuration of Air-Conditioning System

Figure 1:
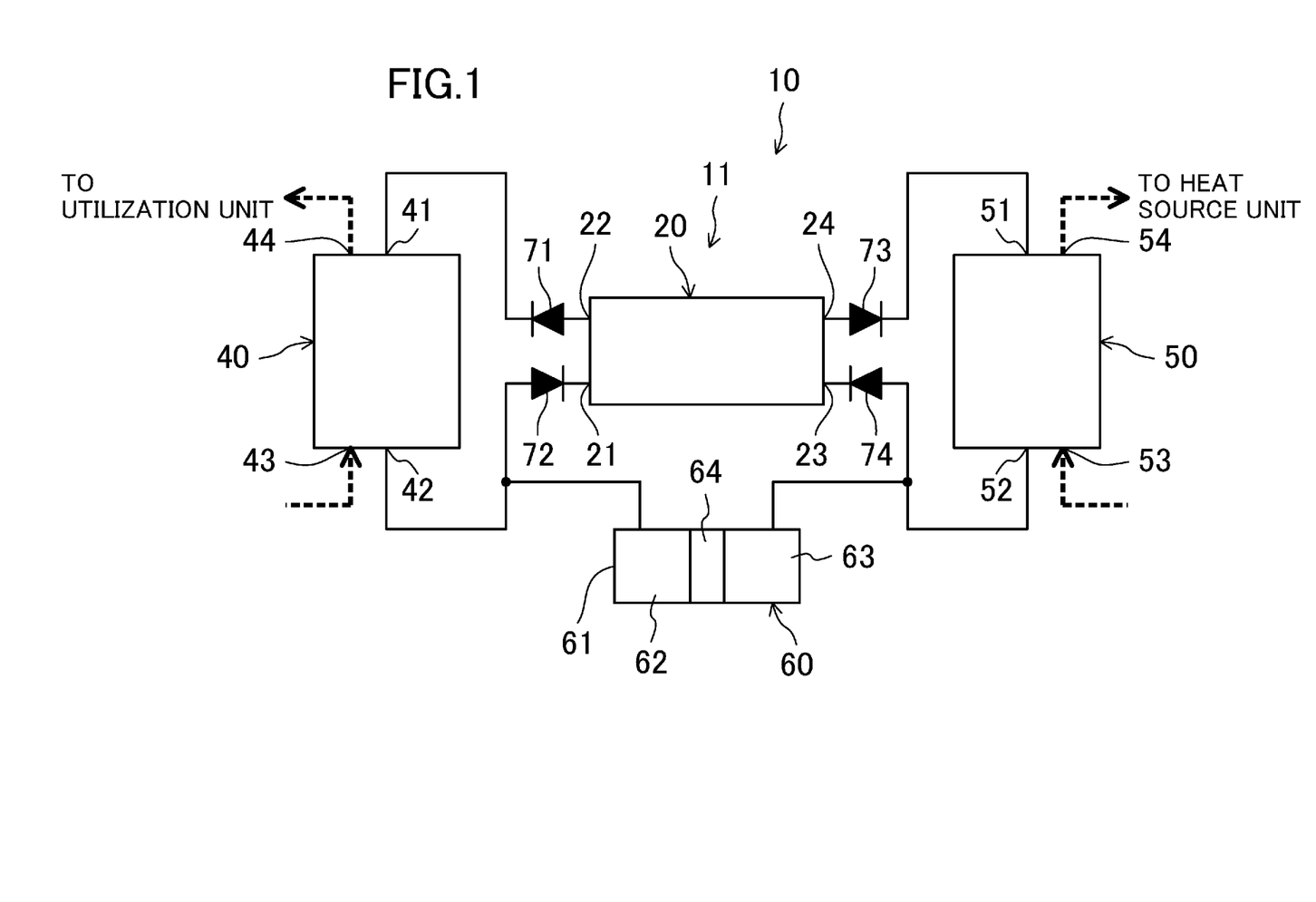
FIG. 1 is a circuit diagram schematically illustrating a configuration of an air-conditioning system according to a first embodiment.

FIG. 1 is a circuit diagram schematically illustrating a configuration of an air-conditioning system (10) according to the first embodiment. As shown in FIG. 1, the air-conditioning system (10) includes a fluid circuit (11). The fluid circuit (11) includes a fluid temperature control device (20), a low-temperature heat exchanger (40), a high-temperature heat exchanger (50), and a fluid pump (60). The components of the fluid circuit (11) are connected together through fluid pipes.

The fluid temperature control device (20) includes a magnetic working substance (31) to/from which a magnetic field is applied/removed to produce a magnetocaloric effect. This effect allows a fluid flowing through the fluid temperature control device (20) to be heated or cooled. The fluid temperature control device (20) has a low-temperature inlet (21), a low-temperature outlet (22), a high-temperature inlet (23), and a high-temperature outlet (24). The inlets (21, 23) and the outlets (22, 24) communicate with the internal space of a magnetic working substance container (30) (see FIG. 2) of the fluid temperature control device (20). A fluid that has flowed through the low-temperature inlet (21) flows through the magnetic working substance container (30), and is discharged through the high-temperature outlet (24). A fluid that has flowed through the high-temperature inlet (23) flows through the magnetic working substance container (30), and is discharged through the low-temperature outlet (22). The configuration of the fluid temperature control device (20) will be described in detail below.

The low-temperature heat exchanger (40) exchanges heat between the fluid cooled in the fluid temperature control device (20) and a secondary refrigerant flowing through a utilization unit (such as an air handling unit), which is not illustrated. The low-temperature heat exchanger (40) has a first inlet (41) connected to the low-temperature outlet (22) of the fluid temperature control device (20), a first outflow port (42) connected to the low-temperature inlet (21) of the fluid temperature control device (20), and a third inlet (43) and a third outflow port (44) both connected to the utilization unit.

A fluid pipe between the low-temperature outlet (22) and the first inlet (41) is provided with a first check valve (71), which allows a fluid to flow from the former to the latter while preventing the fluid from flowing in the reverse direction. A fluid pipe between the low-temperature inlet (21) and the first outflow port (42) is provided with a second check valve (72), which allows a fluid to flow from the latter to the former while preventing the fluid from flowing in the reverse direction.

The high-temperature heat exchanger (50) exchanges heat between the fluid heated in the fluid temperature control device (20) and a secondary refrigerant flowing through a heat source unit (such as a cooling tower), which is not illustrated. The high-temperature heat exchanger (50) has a second inlet (51) connected to the high-temperature outlet (24) of the fluid temperature control device (20), a second outflow port (52) connected to the high-temperature inlet (23) of the fluid temperature control device (20), and a fourth inlet (53) and a fourth outflow port (54) both connected to the heat source unit.

A fluid pipe between the high-temperature outlet (24) and the second inlet (51) is provided with a third check valve (73), which allows a fluid to flow from the former to the latter while preventing the fluid from flowing in the reverse direction. A fluid pipe between the high-temperature inlet (23) and the second outflow port (52) is provided with a fourth check valve (74), which allows a fluid to flow from the latter to the former while preventing the fluid from flowing in the reverse direction.

The fluid pump (60) allows a fluid to flow between the fluid temperature control device (20) and the heat exchangers (40, 50). The fluid pump (60) is configured as a piston pump in this example, and includes a cylinder (61) and a piston (64) disposed in the cylinder (61). The cylinder (61) is partitioned into a first chamber (62) and a second chamber (63) by the piston (64). The first chamber (62) communicates with the fluid pipe between the low-temperature heat exchanger (40) and the second check valve (72), and the second chamber (63) communicates with the fluid pipe between the high-temperature heat exchanger (50) and the fourth check valve (74).

The fluid pump (60) has its piston (64) reciprocated through the cylinder (61) to perform a first operation for discharging a fluid from the first chamber (62) and sucking a fluid into the second chamber (63) and a second operation for discharging a fluid from the second chamber (63) and sucking a fluid into the first chamber (62).

Configuration of Fluid Temperature Control Device

Figure 2:
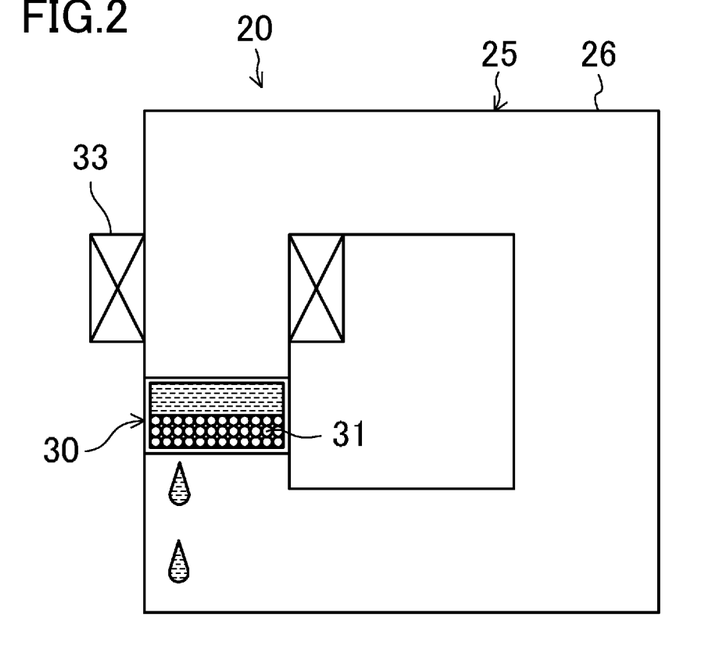
FIG. 2 is a front view schematically illustrating a configuration of a fluid temperature control device according to the first embodiment.

FIG. 2 is a front view schematically illustrating a configuration of the fluid temperature control device (20). As shown in FIG. 2, the fluid temperature control device (20) includes a magnetic circuit portion (25) including a magnetic working substance container (30) and a coil (33). The coil (33) is connected to a power source (not shown) to supply electric current through the coil (33).

The magnetic circuit portion (25) forms a closed circuit including a substantially square frame-shaped core (26) which is made of a magnetic material and through which two end portions (upper and lower end portions in FIG. 2) of the magnetic working substance container (30) are magnetically connected together. The coil (33) is wound around a portion of the core (26) above the magnetic working substance container (30). Such a layout structure of the coil (33) constitutes a coil waterproof structure that prevents water generated in the magnetic working substance container (30) from reaching the coil (33).

The magnetic working substance container (30) is configured as an active magnetic regenerator (AMR) bed which contains the magnetic working substance (31) and which allows a fluid to flow therethrough. Electric current flowing through the coil (33) allows a magnetic field to be applied to the magnetic working substance (31), which generates heat. On the other hand, interrupting the flow of the electric current through the coil (33) allows the magnetic field to be removed from the magnetic working substance (31), which absorbs heat. Examples of the material of the magnetic working substance (31) include $Gd_5(Ge_{0.5}Si_{0.5})_4$, $La(Fe_{1-x}Si_x)_{13}$, $La(Fe_{1-x}Co_xSi_y)_{13}$, $La(Fe_{1-x}Si_x)_{13}H_y$, and $Mn(As_{0.9}Sb_{0.1})$.

Operation

Next, operations of the air-conditioning system (10) and the fluid temperature control device (20) will be described.

The air-conditioning system (10) makes the fluid pump (60) alternately perform the first and second operations, and supplies electric current through the coil (33) of the fluid temperature control device (20) or interrupts the flow of the electric current through the coil (33), in response to these operations. This allows cold thermal energy to be supplied to the utilization unit.

Specifically, first, while the flow of the fluid is stopped, electric current is supplied through the coil (33) of the fluid temperature control device (20). This allows a magnetic field to be applied to the magnetic working substance (31) in the magnetic working substance container (30). As a result, the magnetic working substance (31) generates heat. The first operation performed by the fluid pump (60) in this state allows the piston (64) to move to the left in FIG. 1. Thus, the fluid is discharged from the first chamber (62). The fluid discharged from the first chamber (62) flows through the second check valve (72) into the magnetic working substance container (30). In the magnetic working substance container (30), the fluid exchanges heat with the heat-generating magnetic working substance (31) so as to be heated, and is then pushed out by a fluid flowing into the magnetic working substance container (30). The heated fluid flows through the third check valve (73) into the high-temperature heat exchanger (50), then radiates heat to the secondary refrigerant of the heat source unit, and flows out of the high-temperature heat exchanger (50). The fluid that has flowed out of the high-temperature heat exchanger (50) is sucked into the second chamber (63) of the fluid pump (60).

Next, while the flow of the fluid is stopped, electric current flowing toward the coil (33) of the fluid temperature control device (20) is interrupted. This allows a magnetic field to be removed from the magnetic working substance (31) in the magnetic working substance container (30). As a result, the magnetic working substance (31) absorbs heat. The second operation performed by the fluid pump (60) in this state allows the piston (64) to move to the right in FIG. 1. Thus, the fluid is discharged from the second chamber (63). The fluid discharged from the second chamber (63) flows through the fourth check valve (74) into the magnetic working substance container (30). In the magnetic working substance container (30), the fluid exchanges heat with the heat-absorbing magnetic working substance (31) so as to be cooled, and is then pushed out by a fluid flowing into the magnetic working substance container (30). The cooled fluid flows through the first check valve (71) into the low-temperature heat exchanger (40), then cools the secondary refrigerant of the utilization unit, and flows out of the low-temperature heat exchanger (40). The fluid that has flowed out of the low-temperature heat exchanger (40) is sucked into the first chamber (62) of the fluid pump (60).

Repeating the foregoing operations allows cold thermal energy to be supplied to the low-temperature heat exchanger (40), and allows warm thermal energy to be supplied to the high-temperature heat exchanger (50). Thus, the utilization unit can cool a target space. In a steady state, the low-temperature heat exchanger (40) and the high-temperature heat exchanger (50) are maintained at respective, substantially fixed temperatures adapted to the magnetic working substance (31) in the magnetic working substance container (30). In this embodiment, the magnetic working substance (31) is selected so that the temperature of the low-temperature heat exchanger (40) is maintained at a temperature lower than the temperature of the target space and the temperature of air around the magnetic working substance container (30).

Production and Flow of Condensate Water

The magnetic working substance (31) absorbing heat may cause the fluid flowing through the magnetic working substance container (30) and the ambient air to be both cooled, resulting in condensate water generated in the magnetic working substance container (30). Specifically, the magnetic working substance (31) absorbing heat causes the fluid flowing through the magnetic working substance container (30) to be cooled. This causes the magnetic working substance container (30) and, in turn, air on the surface of the magnetic working substance container (30) to be cooled, resulting in condensate water generated. Then, the condensate water generated in the magnetic working substance container (30) flows along the core (26) forming the magnetic circuit portion (25) in the horizontal and downward directions (FIG. 2 illustrates the downward flow of the condensate water). In this embodiment, the coil (33) is disposed above the magnetic working substance container (30) in a direction different from these directions. This substantially prevents the condensate water generated in the magnetic working substance container (30) from reaching the coil (33).

Advantages of First Embodiment

The fluid temperature control device (20) of this embodiment includes the magnetic circuit portion (25) including the magnetic working substance container (30) that contains the magnetic working substance (31) and allows the fluid to flow therethrough to exchange heat with the magnetic working substance (31) and the coil (33) that applies a magnetic field to the magnetic working substance container (30), and the coil waterproof structure that is provided for the magnetic circuit portion (25) and hinders water generated in the magnetic working substance container (30) from flowing to the coil (33).

The coil (33) of the magnetic circuit portion (25) of the fluid temperature control device (20) applies/removes a magnetic field to/from the magnetic working substance container (30). With the application of the magnetic field, the magnetic working substance (31) generates heat, and with the removal of the magnetic field, the magnetic working substance (31) absorbs heat. Accordingly, the fluid flowing through the magnetic working substance container (30) exchanges heat with the magnetic working substance (31) to be heated or cooled.

In the fluid temperature control device (20), the magnetic working substance (31) absorbing heat, for example, may cause cooling of air around the magnetic working substance container (30), resulting in condensate water generated. Such condensate water or water flowing along the magnetic circuit portion (25) to the coil (33) may cause current leakage from the coil (33) through the fluid.

To address this problem, in this embodiment, the magnetic circuit portion (25) includes a coil waterproof structure to hinder water generated in the magnetic working substance container (30) from flowing to the coil (33). This coil waterproof structure hinders condensate water generated in the magnetic working substance container (30) from flowing to the coil (33). This can hinder current leakage from the coil (33) through water.

The coil waterproof structure of the fluid temperature control device (20) according to this embodiment is a structure in which the coil (33) is disposed at a higher level than a path through which the water generated in the magnetic working substance container (30) flows. This substantially prevents water from flowing above the path, and substantially prevents water from reaching the coil (33) disposed at a higher level than the path.

The fluid temperature control device (20) of this embodiment has its coil (33) disposed above the magnetic working substance container (30). This substantially prevents the water generated in the magnetic working substance container (30) from reaching the coil (33) disposed above the magnetic working substance container (30).

Second Embodiment

A second embodiment will be described. This embodiment differs from the first embodiment in a configuration of a coil waterproof structure of a fluid temperature control device (20). Differences from the first embodiment will now be mainly described.

Figure 3:
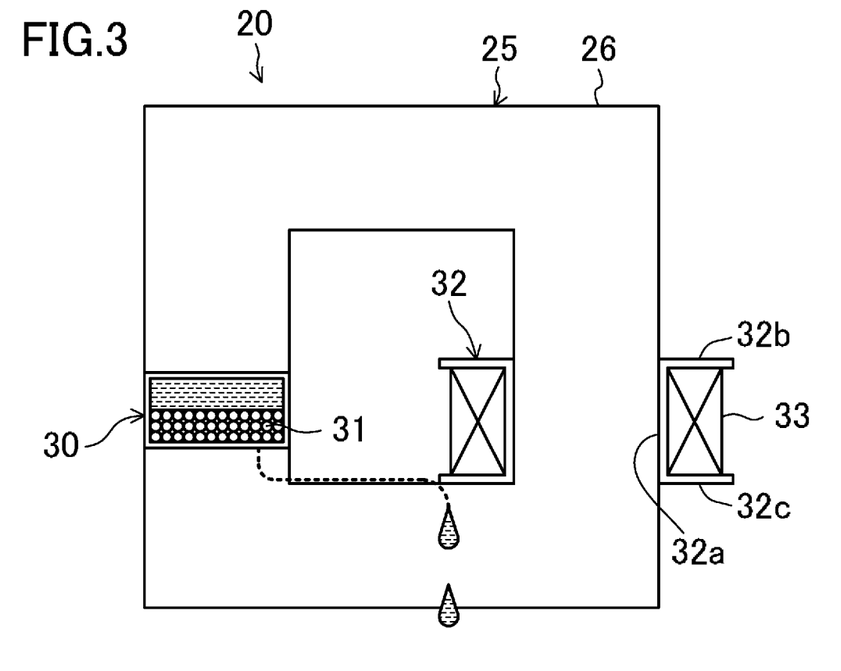
FIG. 3 is a front view schematically illustrating a configuration of a fluid temperature control device according to a second embodiment.

FIG. 3 is a front view schematically illustrating a configuration of a fluid temperature control device (20) according to the second embodiment. As shown in FIG. 3, a coil (33) is wound around a core (26) forming a magnetic circuit portion (25) via a bobbin (32) attached to the core (26). The bobbin (32) is spaced apart from a magnetic working substance container (30), and has a cylindrical portion (32a) extending vertically along the core (26), an upper flange portion (32b) extending radially outward from the upper end of the cylindrical portion (32a), and a lower flange portion (32c) extending radially outward from the lower end of the cylindrical portion (32a). The bobbin (32) constitutes a coil waterproof structure.

As shown in FIG. 3, the lower flange portion (32c) of the bobbin (32) blocks condensate water generated in the magnetic working substance container (30) and flowing toward the coil (33), and hinders the condensate water from reaching the coil (33). Alternatively, the thickness, i.e., the vertical length, of the lower flange portion (32c) of the bobbin (32) is set to be great enough to hinder the condensate water generated in the magnetic working substance container (30) from reaching the coil (33). A lower surface of the lower flange portion (32c) of the bobbin (32) may be in contact with the core (26), or may be spaced apart from the core (26).

Advantages of Second Embodiment

This embodiment also achieves the same advantages and effects as those of the first embodiment.

The coil waterproof structure of the fluid temperature control device (20) according to this embodiment includes the bobbin (32) around which the coil (33) is wound. The bobbin (32) has the lower flange portion (32) to prevent water that has flowed out of the magnetic working substance container (30) from reaching the coil (33). Thus, the flow of water out of the magnetic working substance container (30) is blocked by the lower flange portion (32c) of the bobbin (32). This hinders the water from reaching the coil (33).

Third Embodiment

A third embodiment will be described. This embodiment differs from the first embodiment in a configuration of a coil waterproof structure of a fluid temperature control device (20). Differences from the first embodiment will now be mainly described.

Figure 4:
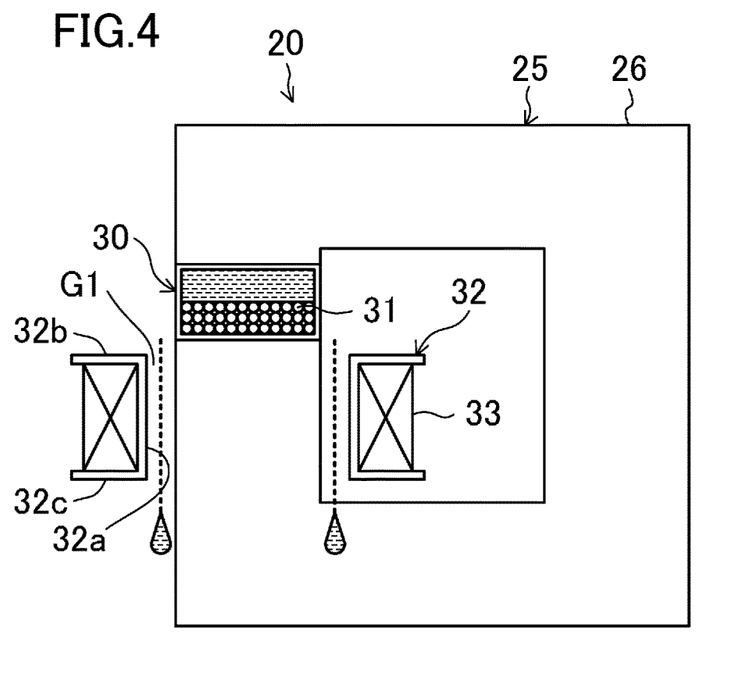
FIG. 4 is a front view schematically illustrating a configuration of a fluid temperature control device according to a third embodiment.

FIG. 4 is a front view schematically illustrating a configuration of a fluid temperature control device (20) according to the third embodiment. As shown in FIG. 4, a coil (33) is wound around a core (26) forming a magnetic circuit portion (25) via a bobbin (32) attached to a portion of the core (26) below a magnetic working substance container (30). The bobbin (32) has a cylindrical portion (32a) extending vertically along the core (26), an upper flange portion (32b) extending radially outward from the upper end of the cylindrical portion (32a), and a lower flange portion (32c) extending radially outward from the lower end of the cylindrical portion (32a). A gap (G1) is located between the cylindrical portion (32a) of the bobbin (32) and the core (26) along the entire vertical length of the bobbin (32). In other words, the gap (G1) is located between the core (26) and the coil (33). A structure having the gap (G1) constitutes a coil waterproof structure.

As shown in FIG. 4, condensate water generated in the magnetic working substance container (30) and flowing downward passes through the gap (G1) between the bobbin (32) and the core (26), and flows further downward. This prevents the condensate water from reaching the coil (33) wound around the bobbin (32).

Advantages of Third Embodiment

This embodiment also achieves the same advantages and effects as those of the first embodiment.

In addition, the coil waterproof structure of the fluid temperature control device (20) according to this embodiment has its gap (G1) located between the core (26) forming the magnetic circuit portion (25) and the coil (33). Thus, even if water generated in the magnetic working substance container (30) flows along the core (26) to the location at which the coil (33) is disposed, the water flows through the gap (G1), and does not reach the coil (33).

In this embodiment, for example, even if the core (26) is cooled through the magnetic working substance container (30), thereby generating condensate water on the core (26), and the condensate water flows along the core (26) to the location at which the coil (33) is disposed, the condensate water flows through the gap (G1), and does not reach the coil (33).

In addition, in this embodiment, the gap (G1) between the core (26) and the coil (33) makes it difficult for heat generated by the coil (33) to be transferred through the core (26) to the magnetic working substance container (30). This can hinder the heat generated by the coil (33) from causing a reduction in the temperature difference in the magnetic working substance container (30).

Fourth Embodiment

A fourth embodiment will be described. This embodiment differs from the first embodiment in a configuration of a coil waterproof structure of a fluid temperature control device (20). Differences from the first embodiment will now be mainly described.

Figure 5:
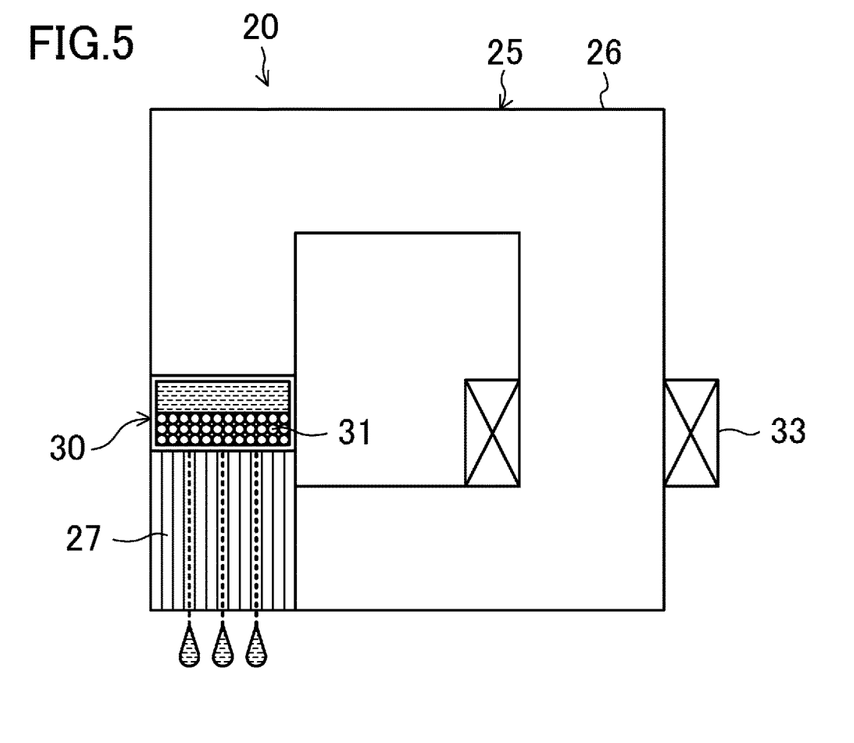
FIG. 5 is a front view schematically illustrating a configuration of a fluid temperature control device according to a fourth embodiment.

FIG. 5 is a front view schematically illustrating a configuration of a fluid temperature control device (20) according to the fourth embodiment. As shown in FIG. 5, a coil (33) is wound around a core (26) forming a magnetic circuit portion (25) so as to be spaced apart from a magnetic working substance container (30) in the lateral direction of the magnetic working substance container (30). A portion of the core (26) under the magnetic working substance container (30) has water grooves (27) extending vertically from the lower end of the magnetic working substance container (30) to the lower end of the core (26). The water grooves (27) constitute a coil waterproof structure.

As shown in FIG. 5, condensate water generated in the magnetic working substance container (30) is guided to the water grooves (27), and flows downward. This prevents the condensate water from reaching the coil (33) disposed in the lateral direction of the magnetic working substance container (30). Note that the water grooves (27) may have any shape and any size as long as they function to guide the water generated in the magnetic working substance container (30) so that the water does not reach the coil (33).

Advantages of Fourth Embodiment

This embodiment also achieves the same advantages and effects as those of the first embodiment.

The coil waterproof structure of the fluid temperature control device (20) according to this embodiment is the water grooves (27) located under the magnetic working substance container (30) in the core (26) that forms the magnetic circuit portion (25). The water grooves (27) guide the water generated in the magnetic working substance container (30) so that the water does not reach the coil (33). Thus, the water generated in the magnetic working substance container (30) flows while being guided to the water grooves (27) located under the magnetic working substance container (30), and does not reach the coil (33).

Fifth Embodiment

A fifth embodiment will be described. This embodiment differs from the first embodiment in a configuration of a coil waterproof structure of a fluid temperature control device (20). Differences from the first embodiment will now be mainly described.

Figure 6:
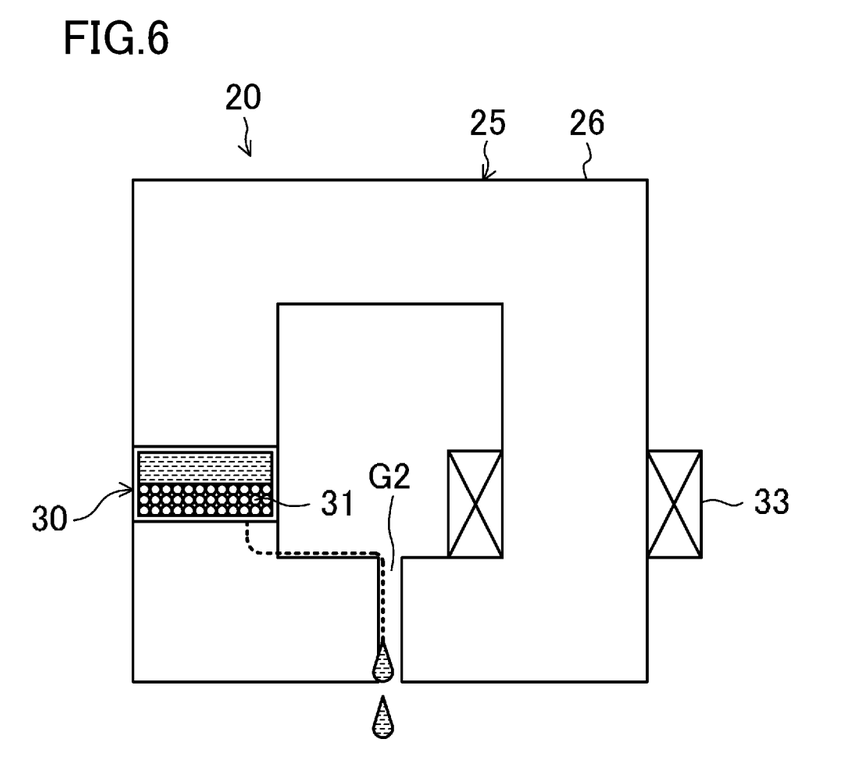
FIG. 6 is a front view schematically illustrating a configuration of a fluid temperature control device according to a fifth embodiment.

FIG. 6 is a front view schematically illustrating a configuration of a fluid temperature control device (20) according to the fifth embodiment. As shown in FIG. 6, a coil (33) is wound around a core (26) forming a magnetic circuit portion (25) so as to be spaced apart from a magnetic working substance container (30) in the lateral direction of the magnetic working substance container (30). A portion of the core (26) between the magnetic working substance container (30) and the coil (33) has an air gap (G2) dividing the core (26). The air gap (G2) constitutes a coil waterproof structure.

As shown in FIG. 6, even if condensate water generated in the magnetic working substance container (30) flows along the core (26) toward the coil (33), the flow of the condensate water is interrupted by the air gap (G2). This prevents the condensate water from reaching the coil (33).

Advantages of Fifth Embodiment

This embodiment also achieves the same advantages and effects as those of the first embodiment.

The coil waterproof structure of the fluid temperature control device (20) according to this embodiment is the air gap (G2) located between the magnetic working substance container (30) and the coil (33) in the core (26) forming the magnetic circuit portion (25). Thus, even if the water generated in the magnetic working substance container (30) flows along the core (26) toward the coil (33), the flow of the water is interrupted by the air gap (G2) located upstream of the coil (33). This substantially prevents the water from flowing across the air gap (G2) to the coil (33).

Sixth Embodiment

A sixth embodiment will be described. This embodiment differs from the first embodiment in a configuration of a coil waterproof structure of a fluid temperature control device (20). Differences from the first embodiment will now be mainly described.

Figure 7:
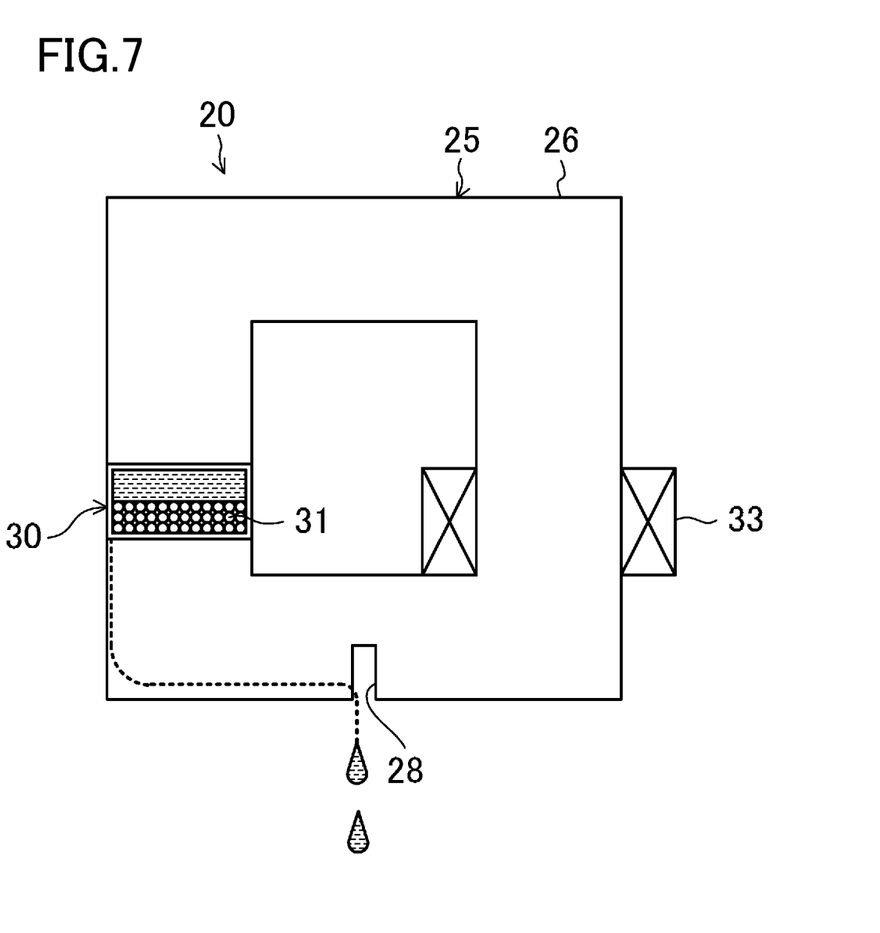
FIG. 7 is a front view schematically illustrating a configuration of a fluid temperature control device according to a sixth embodiment.

FIG. 7 is a front view schematically illustrating a configuration of a fluid temperature control device (20) according to the sixth embodiment. As shown in FIG. 4, a coil (33) is wound around a core (26) forming a magnetic circuit portion (25) so as to be spaced apart from a magnetic working substance container (30) in the lateral direction of the magnetic working substance container (30). A portion of the core (26) between the magnetic working substance container (30) and the coil (33) is partially cut away to form a recess (28). The recess (28) constitutes a coil waterproof structure, and is located in a lower surface of the core (26) in one preferred embodiment.

As shown in FIG. 7, even if condensate water generated in the magnetic working substance container (30) flows along the core (26) toward the coil (33), the flow of the condensate water is interrupted by the recess (28). This prevents the condensate water from reaching the coil (33).

Advantages of Sixth Embodiment

This embodiment also achieves the same advantages and effects as those of the first embodiment.

The coil waterproof structure of the fluid temperature control device (20) according to this embodiment is the recess (28) located between the magnetic working substance container (30) and the coil (33) in the core (26) that forms the magnetic circuit portion (25). Thus, even if water generated in the magnetic working substance container (30) flows along the core (26) toward the coil (33), the flow of the water is interrupted by the recess (28) located upstream of the coil (33). This substantially prevents the water from flowing across the recess (28) to the coil (33).

Variation of Sixth Embodiment

A variation of the sixth embodiment will be described. This variation differs from the sixth embodiment in a configuration of a coil waterproof structure. Differences from the sixth embodiment will now be mainly described.

Figure 8:
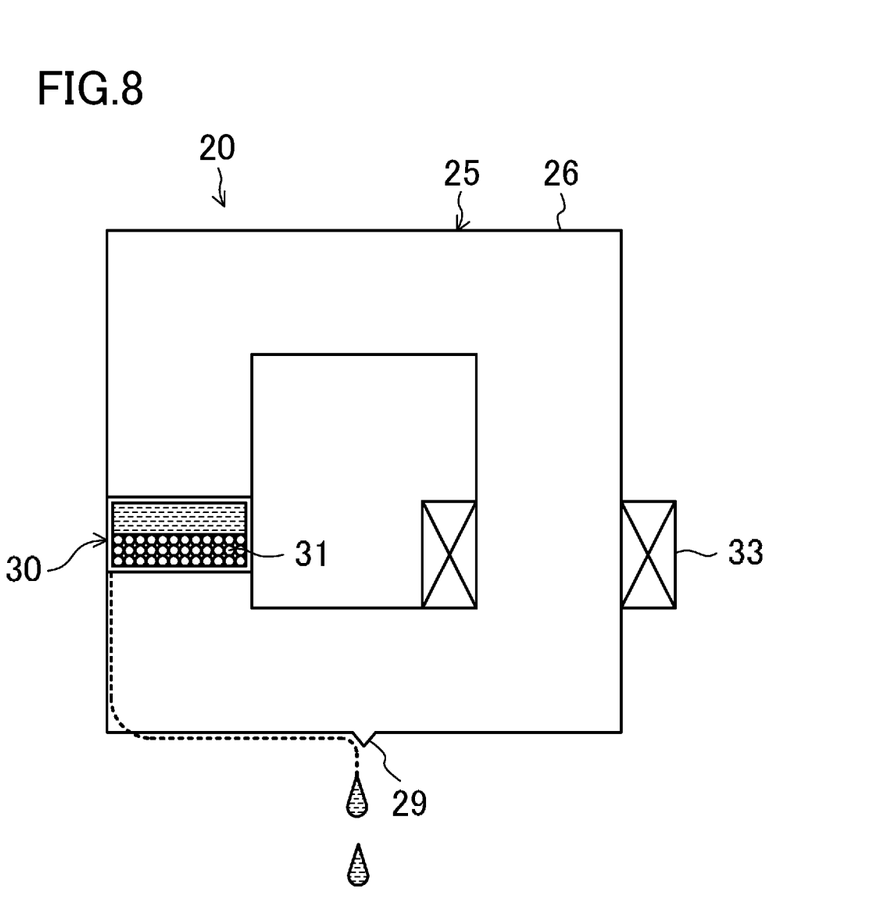
FIG. 8 is a front view schematically illustrating a configuration of a fluid temperature control device according to a variation of the sixth embodiment.

FIG. 8 is a front view schematically illustrating a configuration of a fluid temperature control device (20) according to the variation of the sixth embodiment. A portion of the core (26) between the magnetic working substance container (30) and the coil (33) has a protrusion (29) protruding downward from the lower surface of the core (26). The protrusion (29) constitutes a coil waterproof structure.

As shown in FIG. 8, even if condensate water generated in the magnetic working substance container (30) flows along the core (26) toward the coil (33), the flow of the condensate water is interrupted by the protrusion (29). This prevents the condensate water from reaching the coil (33).

Seventh Embodiment

A seventh embodiment will be described. This embodiment differs from the first embodiment in a configuration of a coil waterproof structure of a fluid temperature control device (20). Differences from the first embodiment will now be mainly described.

Figure 9:
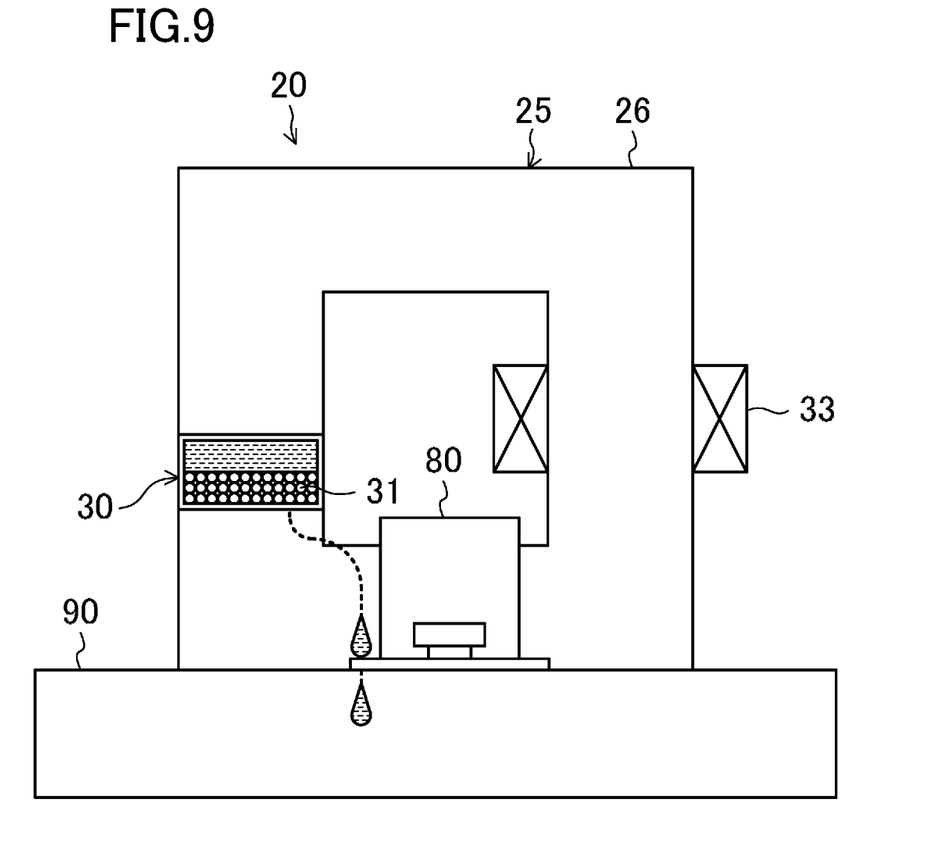
FIG. 9 is a front view schematically illustrating a configuration of a fluid temperature control device according to a seventh embodiment.

FIG. 9 is a front view schematically illustrating a configuration of a fluid temperature control device (20) according to the seventh embodiment. As shown in FIG. 9, a coil (33) is wound around a core (26) forming a magnetic circuit portion (25) so as to be spaced apart from a magnetic working substance container (30) in the lateral direction of the magnetic working substance container (30). A portion of the core (26) between the magnetic working substance container (30) and the coil (33) is provided with a fixing member (80). The fluid temperature control device (20) is fixed to a predetermined member (90) (e.g., a casing) via the fixing member (80). The fixing member (80) constitutes a coil waterproof structure, and extends across the vertical length of the portion of the core (26) between the magnetic working substance container (30) and the coil (33) in one preferred embodiment.

As shown in FIG. 9, even if condensate water generated in the magnetic working substance container (30) flows along the core (26) toward the coil (33), the flow of the condensate water is blocked by the fixing member (80). This prevents the condensate water from reaching the coil (33).

Advantages of Seventh Embodiment

This embodiment also achieves the same advantages and effects as those of the first embodiment.

The fluid temperature control device (20) according to this embodiment includes a fixing member (80) that is provided between the magnetic working substance container (30) and the coil (33) in the core (26) that forms the magnetic circuit portion (25) and fixes the fluid temperature control device (20) to the predetermined member (90). The fixing member (80) hinders the water flowing out of the magnetic working substance container (30) from reaching the coil (33), and constitutes the coil waterproof structure. Thus, the fluid temperature control device (20) is fixed to the predetermined member (90) by the fixing member (80). In addition, the fixing member (80) constitutes the coil waterproof structure. Even if the water generated in the magnetic working substance container (30) flows along the core (26) toward the coil (33), the flow of the water is interrupted by the fixing member (80) located upstream of the coil (33). This substantially prevents the water from flowing across the fixing member (80) to the coil (33).

Other Embodiments

The foregoing embodiments may also be configured as follows.

In each of the foregoing embodiments, an operation for applying/removing a magnetic field to/from a magnetic working substance (31) is performed through the on/off control of the electric current flowing through the coil (33). However, this operation may be performed through control of the intensity of electric current through the coil (33).

While the embodiments and a variation thereof have been described above, it will be understood that various changes in form and details may be made without departing from the spirit and scope of the claims. The embodiments and the variation thereof may be combined and replaced with each other without deteriorating intended functions of the present disclosure.

As can be seen from the foregoing description, the present disclosure is useful for a fluid temperature control device.

The invention claimed is:

1. A fluid temperature control device comprising:
   a magnetic circuit portion including
      a magnetic working substance container containing a magnetic working substance, the magnetic working substance container allowing a fluid to flow therethrough to exchange heat with the magnetic working substance, and
      a coil configured to apply a magnetic field to the magnetic working substance container; and
   the coil being disposed at a higher level than a path through which water generated in the magnetic working substance container flows to hinder the water generated in the magnetic working substance container from flowing to the coil.

2. The fluid temperature control device of claim 1, wherein
   the coil is disposed above the magnetic working substance container.

3. The fluid temperature control device of claim 1, further comprising:
   a fixing member
      disposed between the magnetic working substance container and the coil in a core forming part of the magnetic circuit portion, and
      fixing the fluid temperature control device to a predetermined member,
   the fixing member being arranged and configured to hinder water that has flowed out of the magnetic working substance container from reaching the coil.

* * * * *